March 5, 1940.   R. BLOCH ET AL   2,192,824

ABSORPTION REFRIGERATION SYSTEM

Filed May 7, 1936

R. Bloch
F. Goldberger
INVENTORS

By: Glascock Downing & Seebold
Attys.

Patented Mar. 5, 1940

2,192,824

UNITED STATES PATENT OFFICE 2,192,824

ABSORPTION REFRIGERATION SYSTEM

Rudolf Bloch and Franz Goldberger, Moravska Ostrava, Czechoslovakia

Application May 7, 1936, Serial No. 78,456 In Germany May 9, 1935

6 Claims. (Cl. 62—118)

This invention relates to refrigeration system, especially to intermittent dry absorption refrigerating systems and apparatus.

In such apparatus it has hitherto been necessary to locate the condenser above the evaporator in order that the liquefied cooling agent can flow by gravity direct into the evaporator or into an intervening container located above the evaporator. The dry absorption system possesses certain practical advantages especially simplicity over other systems but its has the disadvantage of presenting the cold storage chamber inconveniently low and surmounted by the condenser and the generator-absorber or at least by the condenser. To obviate this drawback it has been attempted to place only a subsidiary condenser above the evaporator, and to place the generator-absorber and a main condenser below; such an arrangement however is only partially successful because at least one part of the plant remains above the cold storage chamber.

A proposal to locate the condenser below the evaporator having a container for liquefied refrigerant above the evaporator is not entirely satisfactory because the liquefied cooling agent does not wholly pass out of the condenser into the container and consequently the liquefied cooling agent is not wholly utilised for cooling and therefore a loss of cooling capacity results.

According to the present invention the system ocmprises a heat insulated container located above the evaporator and communicating with a second container located below the first container, the latter being also connected directly on the one hand with the generator absorber and on the other hand with the evaporator within the storage chamber and said second or lower container being connected to the condenser, which latter may be located either at the side of or below the storage chamber.

Such an arrangement is in striking contrast with known dry absorption plants wherein it is usual for a generator absorber to be connected directly with a condenser and for this condenser to be connected with an insulated container by a downward delivery pipe.

Figure 1:
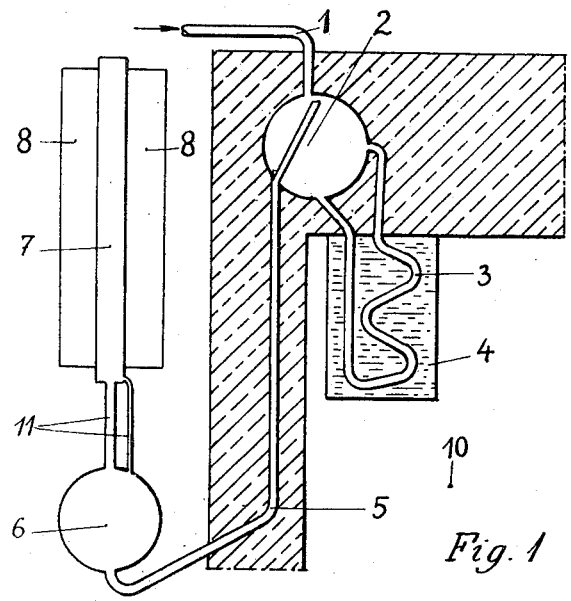
Figure 2:
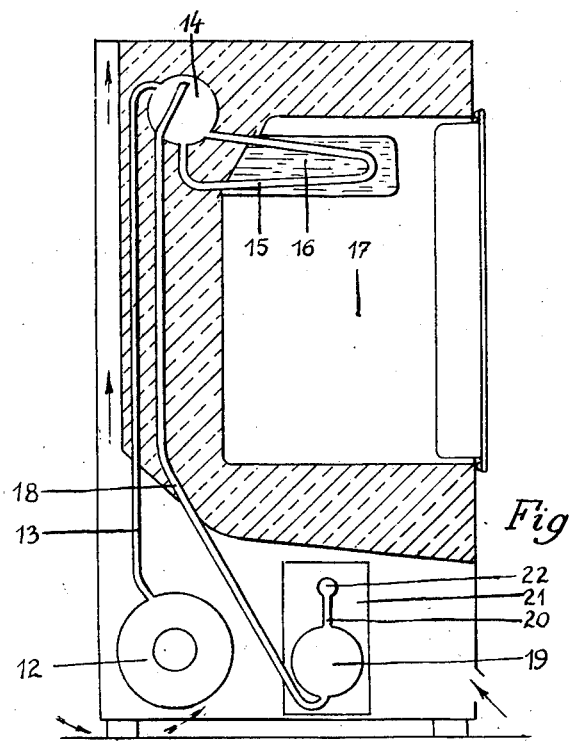

The invention will be now more particularly described with reference to the accompanying drawing in which Figure 1 represents schematically the essential portions of a refrigerator according to the invention, and Figure 2 represents a slight modification thereof.

Referring first to Figure 1 the reference numeral 1 indicates the only pipe line leading from the generator-absorber (not shown) directly to an upper part of an upper or first liquefied refrigerant container 2 which is heat insulated as by being embedded in the heat insulating wall of the cold storage chamber 10. Within the chamber 10 is the evaporator coil 3 which may if desired and as shown be immersed in brine in a vessel 4. The coil 3 is of essentially smaller size than container 2, and has communication to and from the first 2, and or upper container 2. 6 is the second or lower container connected at its lowest part by a pipe 5 leading to the uppermost part (near the roof) of the upper container 2. The reason for this disposition of the pipe is that it should suck the whole of the refrigerant from the lower container, and that when the liquefied refrigerant has passed up into the upper container it should not be capable of running back into the lower container. In order to avoid the resuction of any liquefied refrigerant into the generator-absorber during the cooling periods, the volume of the upper container 2 is larger than the entire condenser refrigerant needs. Above the second container 6 is located the condenser 7 provided with cooling ribs 8 and connected with the container 6 by pipes 11. The container 6 can be insulated.

The arrangement shown in Figure 2 is in many respects similar to that shown in Figure 1. 14 is the upper or first container of liquefied refrigerant, 15 is the evaporator immersed in a brine vessel 16 in the cold storage chamber 17; 19 is the lower or second container and 18 is the connecting pipe between it and the upper container. 22 is a condenser or condenser pipe and 20 is the pipe connecting the lower container 19 with this condenser. 21 are ribs around the condenser and they can be extended also around the lower container as shown. Whereas in Figure 1 the lower or second container 6 and the condenser 7 are located behind the rear vertical wall of the storage chamber, it is seen that in Figure 2 the lower container 19 and the condenser 22 are located below the storage chamber. Figure 2 also shows the generator-absorber 12 located below the storage chamber and at the rear of the lower container 19, this generator-absorber being directly connected to the upper part of the upper container 14 by only one pipe 13.

Instead of an actual second container 19 with pipe 20 and condenser pipe 22 as in Figure 2, the condenser 22 may itself be constructed with sufficient volume and cooling ribs to serve as the second container.

The action of the plant according to the present invention is as follows:—the condenser 7 or 22 acts during the heating period like a reflux condenser. The liquefied refrigerant collects in the lower container 6 or 19, which is of suitable capacity, not only to contain the whole of the liquefied refrigerant but to provide also an unfilled space. At the end of the heating period the pressure in the generator-absorber drops and the refrigerant itself is therefore sucked up from the lower container into the upper container 2 or 14, which is also of suitable capacity. As soon as the refrigerant reaches the upper container it passes therefrom into the evaporator 3 or 15, where it evaporates and produces the required cold.

The lower container such as 6 in Figure 1, may be insulated as well as the upper container. It may be combined as a unit with the condenser as in Figure 2, the condenser being surrounded by cooling ribs 21 or fitted with a jacket of cooling liquid. A cooling liquid such as water, (which is not changed) may be used, or a substance having a melting point corresponding with the desired condensation temperature; in the latter case the heat of condensation is absorbed by the heat of melting.

We claim:

1. In a dry absorption refrigerating system, a storage chamber having an evaporator arranged therein, a heat insulated container for a liquefied refrigerant located above the evaporator, the volume of said heat insulated container being larger than the entire condensed refrigerant needs, a second container located below the first container and connected with the first container by means of a conduit leading from a lowermost part of said second container to an uppermost part of said first container, a generator-absorber connected by means of one conduit only directly to an uppermost part of the first container, means connecting the first container with the evaporator which is of essentially smaller size than said first container, and a condenser connected to said second container.

2. In a refrigerating apparatus of the dry absorption type, a storage chamber having an evaporator therein, a heat insulated container for a liquid refrigerant located above the evaporator, a generator-absorber connected by means of one conduit only directly to an uppermost part of the heat insulated container, means connecting the heat insulated container with the evaporator, the volume of said heat insulated container being larger than the entire condensed refrigerant needs, a second container, means connecting an uppermost part of the first container with a lowermost part of the second container located below the first container, a condenser connected to said second container, and said condenser and said second container being both arranged at the side of the storage chamber.

3. In a refrigerating apparatus of the dry absorption type, a storage chamber having an evaporator therein, a heat insulated container for a liquid refrigerant located above the evaporator, a generator absorber connected by means of one conduit only directly to an uppermost part of the heat insulated container, means communicating the heat insulated container with the evaporator which is of essentially smaller size than said heat insulated container, the volume of said heat insulated container being larger than the entire condensed refrigerant needs, a second container, means connecting an uppermost part of the first container with a lowermost part of the second container located below the first container, a condenser connected to said second container, and said second container and said condenser being both arranged below the storage chamber.

4. Refrigerating apparatus of the dry absorption type comprising, a storage chamber having an evaporator therein, a heat insulated container located above and communicating with the evaporator, a generator absorber connected by means of one conduit only directly to an uppermost part of the heat insulated container, means connecting the evaporator with the heat insulated container, the volume of said heat insulated container being larger than the entire condensed refrigerant needs, a second container located below the first container and connected to the latter by means of a conduit leading from a lowermost part of said second container to an uppermost part of said first container, a condenser connected to the second container, and said condenser being fitted with a jacket of a solid cooling substance the melting point of which corresponds with the desired condensation temperature.

5. Refrigerating apparatus according to claim 1, in which the second container is heat insulated.

6. Refrigerating apparatus according to claim 1, in which the condenser is constructed with sufficient volume to replace the second container.

RUDOLF BLOCH.
FRANZ GOLDBERGER.